(12) United States Patent
Kim et al.

(10) Patent No.: US 12,036,504 B2
(45) Date of Patent: Jul. 16, 2024

(54) ATMOSPHERE PURIFICATION REACTOR USING ELECTRON BEAM AND ATMOSPHERE PURIFICATION APPARATUS INCLUDING THE SAME

(71) Applicant: KOREA ATOMIC ENERGY RESEARCH INSTITUTE, Daejeon (KR)

(72) Inventors: Byung Nam Kim, Daejeon (KR); Myun Joo Lee, Daejeon (KR); Youn Mook Lim, Jeongeup-si (KR); Kyu Ha Jang, Daejeon (KR); Byun Young Chung, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 589 days.

(21) Appl. No.: 17/288,644

(22) PCT Filed: Sep. 30, 2019

(86) PCT No.: PCT/KR2019/012724
§ 371 (c)(1),
(2) Date: Apr. 26, 2021

(87) PCT Pub. No.: WO2020/085669
PCT Pub. Date: Apr. 30, 2020

(65) Prior Publication Data
US 2021/0402344 A1    Dec. 30, 2021

(30) Foreign Application Priority Data

Oct. 24, 2018  (KR) .................. 10-2018-0127215
Mar. 28, 2019  (KR) .................. 10-2019-0035891
Mar. 28, 2019  (KR) .................. 10-2019-0035892

(51) Int. Cl.
*B01D 53/00*    (2006.01)
*B01D 53/24*    (2006.01)

(52) U.S. Cl.
CPC ........... *B01D 53/007* (2013.01); *B01D 53/24* (2013.01); *B01D 2258/0283* (2013.01); *B01D 2259/812* (2013.01)

(58) Field of Classification Search
CPC .... B01D 53/007; B01D 53/24; B01D 53/323; B01D 2258/0283; B01D 2258/0291; B01D 2259/812
See application file for complete search history.

(56) References Cited

U.S. PATENT DOCUMENTS 3,794,300 A * 2/1974 Harder .................. B01F 25/434
                                                      366/339
4,435,260 A * 3/1984 Koichi .................. B01D 53/60
                                                      204/164

(Continued)

FOREIGN PATENT DOCUMENTS

JP    S53-75163 A     7/1978
JP    H07-284642 A    10/1995

(Continued)

OTHER PUBLICATIONS

International Search Report issued Jan. 16, 2020, corresponding to International Application No. PCT/KR2019/012724 citing the above reference(s).

*Primary Examiner* — Lessanework Seifu
(74) *Attorney, Agent, or Firm* — Hauptman Ham, LLP

(57) ABSTRACT

An atmosphere purification reactor using an electron beam and an atmosphere purification apparatus including the same are disclosed. The atmosphere purification reactor using an electron beam according to an exemplary embodiment of the present invention includes a housing which has a predetermined length and is formed to have a hollow form such that (Continued)

a fluid introduced from an outside passes through the housing, a guide part which is disposed in the housing in a longitudinal direction and guides a moving path of the fluid such that the fluid moves while rotating, and a transmissive part which is provided at one side of the housing so as to transmit an electron beam into the housing.

17 Claims, 15 Drawing Sheets

(56) References Cited

U.S. PATENT DOCUMENTS

| | | | |
|---|---|---|---|
| 5,041,271 A * | 8/1991 | Aoki | B01D 53/60 423/239.1 |
| 5,561,298 A | 10/1996 | Cirlin et al. | |
| 5,605,400 A * | 2/1997 | Kojima | B01F 25/431 366/339 |
| 7,671,522 B2 * | 3/2010 | Lee | A61L 2/087 313/289 |
| 2013/0153404 A1 * | 6/2013 | Sethian | B01D 53/74 204/157.3 |

FOREIGN PATENT DOCUMENTS

| | | |
|---|---|---|
| JP | 2000-515808 A | 11/2000 |
| JP | 2003-294897 A | 10/2003 |
| KR | 10-1999-0045940 A | 6/1999 |
| KR | 20-0285698 Y1 | 8/2002 |
| KR | 10-0577473 B1 | 5/2006 |
| KR | 10-1727969 B1 | 4/2017 |
| KR | 10-2018-0085397 A | 7/2018 |

* cited by examiner

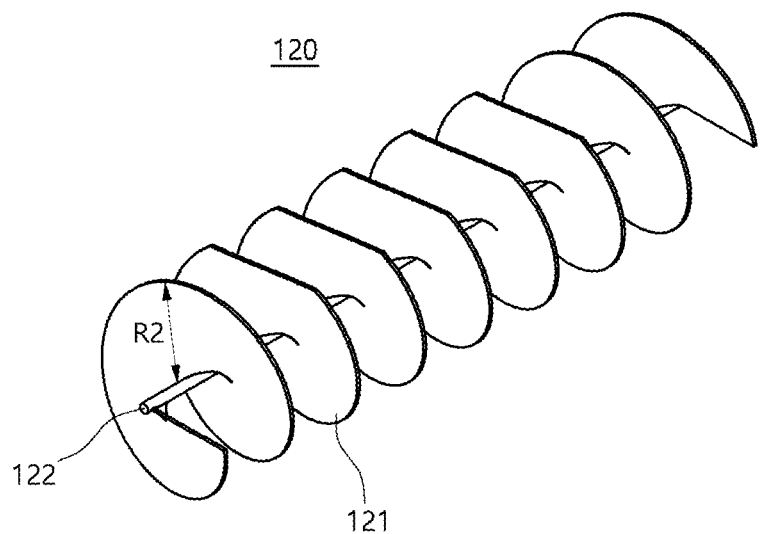
(a)
FIG. 5
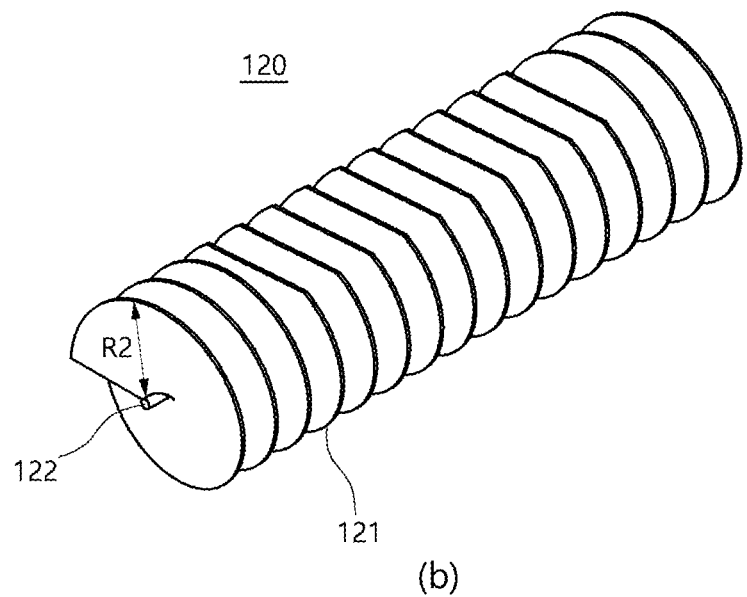
(b)

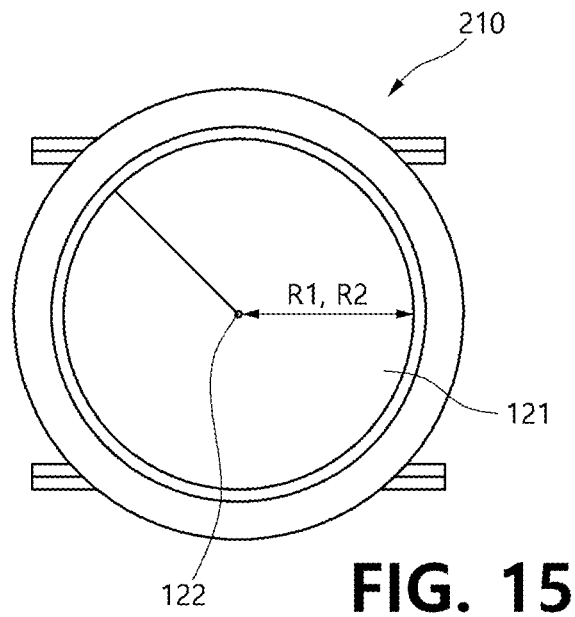
FIG. 15
FIG. 16
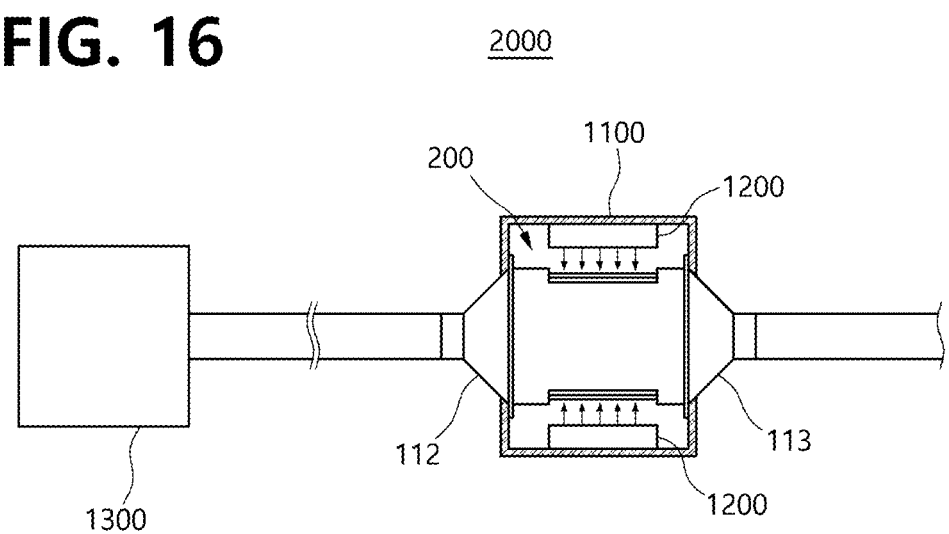

ATMOSPHERE PURIFICATION REACTOR USING ELECTRON BEAM AND ATMOSPHERE PURIFICATION APPARATUS INCLUDING THE SAME

CROSS-REFERENCE TO RELATED APPLICATION

The present application is a national stage filing under 35 U.S.C § 371 of PCT application number PCT/KR2019/012724 filed on Sep. 30, 2019 which is based upon and claims the benefit of priorities to Korean Patent Application No. 10-2018-0127215, filed on Oct. 24, 2018, Korean Patent Application No. 10-2019-0035891, filed on Mar. 28, 2019, and Korean Patent Application No. 10-2019-0035892, filed on Mar. 28, 2019 in the Korean Intellectual Property Office, which are incorporated herein in their entireties by reference.

TECHNICAL FIELD

The present invention relates to an atmosphere purification reactor using an electron beam and an atmosphere purification apparatus including the same.

BACKGROUND ART

Various atmosphere purification technologies using electron accelerators have been introduced worldwide since the 1990s, and various atmosphere purification technologies using electron beams have been domestically introduced in South Korea since the 2000s.

However, emitting windows, which transmit electron beams, of general electron accelerators applied to atmosphere purification technologies have rectangular shapes, and only lateral lengths of the emitting windows are changed according to users' environments and beam energy.

A transmission depth of an electron beam emitted from an electron accelerator is determined by an acceleration voltage of the electron accelerator, that is, beam energy. Generally, since an effective transmission depth of an electron beam is two thirds of a maximum transmission depth thereof, the electron beam emitted through the emitting window is lossed a considerable amount of energy (more than 30%).

Accordingly, an atmosphere purification reactor using a conventional electron beam should use an electron accelerator having higher energy than necessary to secure a process capacity so as to process a large amount of flue gas because of an effective transmission depth and loss of the electron beam.

Accordingly, since the conventional atmosphere purification reactor for processing the large amount of flue gas should use the electron accelerator having beam energy which is higher than necessary, there is a limit in that a size has to be increased. Accordingly, since a size of a chamber for shielding against radiation should be considerably increased, there is a problem in that an installation cost is also considerably increased.

DISCLOSURE

Technical Problem

The present invention is directed to providing an atmosphere purification reactor using an electron beam capable of being entirely and uniformly emitted to flue gas because the flue gas passes through an inside of the reactor while rotating, and an atmosphere purification apparatus including the same.

In addition, the present invention is directed to providing an atmosphere purification reactor using an electron beam capable of increasing a process capacity without decreasing process efficiency, and an atmosphere purification apparatus including the same.

In addition, the present invention is directed to providing an atmosphere purification reactor using an electron beam capable of effectively purifying highly contaminated flue gas, and an atmosphere purification apparatus including the same.

Technical Solution

One aspect of the present invention provides an atmosphere purification reactor using an electron beam including a housing which has a predetermined length and is formed to have a hollow form such that a fluid introduced from an outside passes through the housing, a guide part which is disposed in the housing in a longitudinal direction and guides a moving path of the fluid such that the fluid introduced into the housing moves while rotating, and a transmissive part which is provided at one side of the housing so as to transmit an electron beam into the housing.

Another aspect of the present invention provides an atmosphere purification apparatus including a chamber having an inner space, the above-described atmosphere purification reactor using an electron beam which is disposed in an inner space such that a housing intersects a chamber, and at least one electron beam generator which is disposed in the inner space to be positioned above a transmissive part and emits an electron beam into the housing.

Advantageous Effects

According to the present invention, since flue gas passes through an inside of a reactor while rotating, even when a low energy electron beam is used, the electron beam can be entirely and uniformly emitted to the flue gas. Accordingly, since generation of a dead zone is prevented in the reactor, even when the low energy electron beam is used, a required process capacity can be sufficiently secured.

In addition, according to the present invention, since electron beams emitted by two electron beam generators overlap in the reactor due to two transmissive parts collinear with each other, even when a diameter of a housing is increased, a decrease in process efficiency can be prevented.

In addition, according to the present invention, since two reactors are connected in series and portions thereof connected to each other form a Venturi tube, process efficiency can be improved and an internal pressure of the reactor can also be reduced through sequential purification. Accordingly, even though the present invention uses the low energy electron beam, the process efficiency can be improved, and durability of the reactors can be improved.

In addition, according to the present invention, since overall equipment can be miniaturized according to the present invention, self-shielding is possible, and a cost can be significantly reduced when compared to a conventional case in which a high energy electron beam method is used.

DESCRIPTION OF DRAWINGS

FIG. 5 is a view illustrating various forms of a guide part capable of being used in the atmosphere purification reactor using an electron beam according to the present invention.

FIG. 15 is a front view illustrating the housing of FIG. 11 when an inlet port is removed.

FIG. 16 is a schematic view illustrating an atmosphere purification apparatus according to another embodiment of the present invention.

MODES OF THE INVENTION

Figure 1:
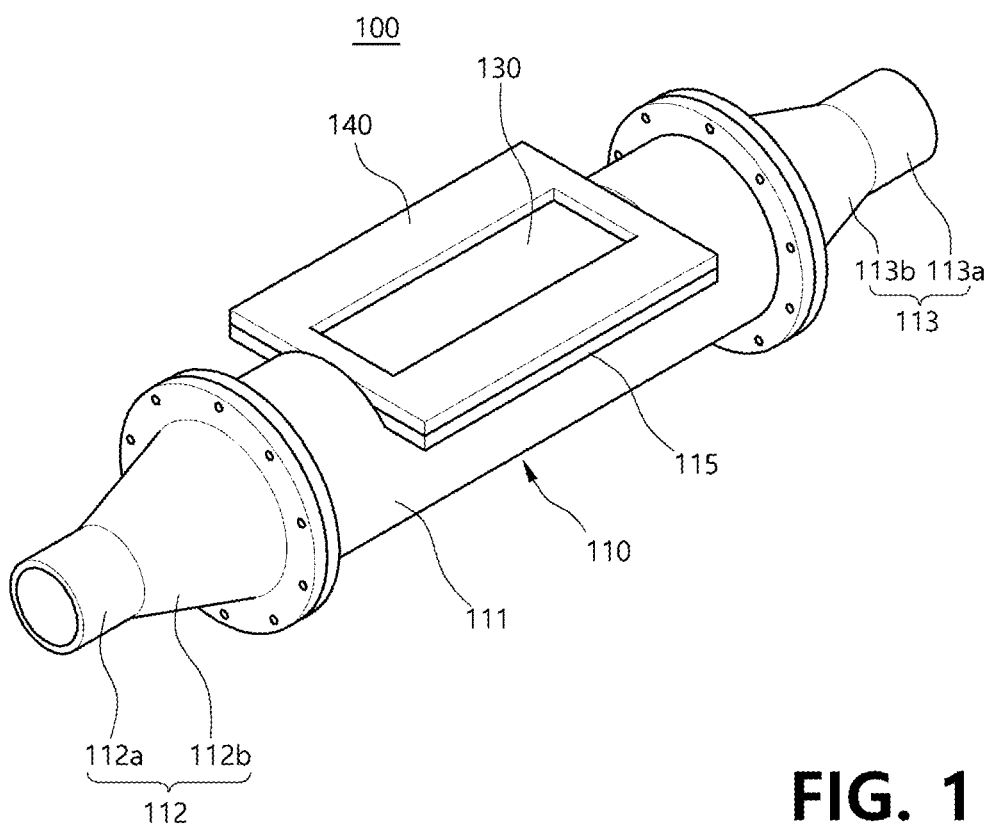
FIG. 1 is a schematic view illustrating an atmosphere purification reactor using an electron beam according to one embodiment of the present invention.
Figure 2:
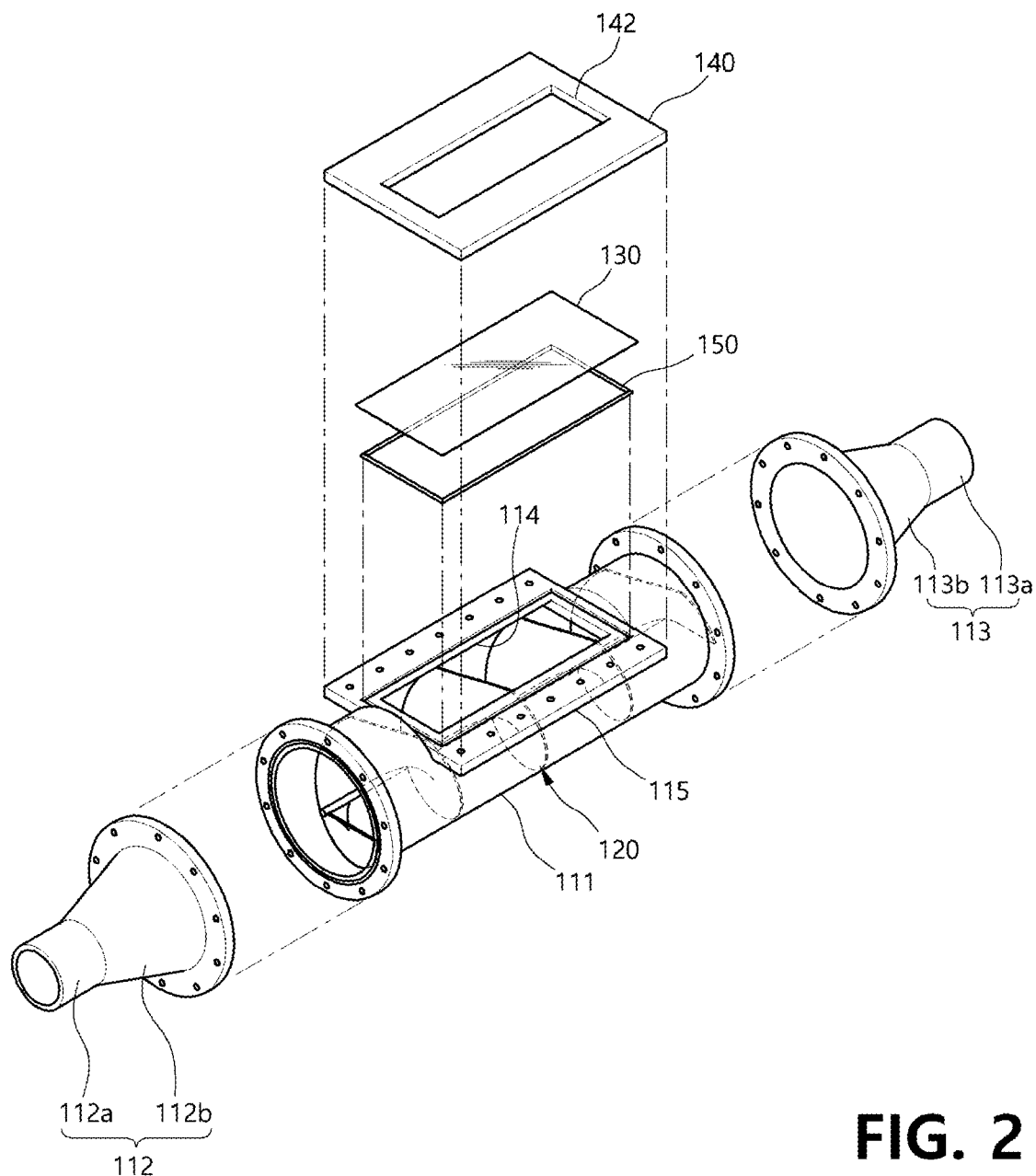
FIG. 2 is an exploded view of FIG. 1.

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to description are omitted in the drawings in order to clearly explain embodiments of the present invention. Similar or the same parts are denoted by similar reference numerals throughout this specification.

In an atmosphere purification reactor using an electron beam (hereinafter, referred to as an 'atmosphere purification reactor') 100, 200, or 300 according to one embodiment of the present invention, since a fluid, such as flue gas, introduced from the outside moves while rotating, even when a low energy electron beam is used, the low energy electron beam may be uniformly emitted to the flue gas.

To this end, as illustrated in FIGS. 1 to 4, 11 to 14, 17, and 18, the atmosphere purification reactor 100, 200, or 300 according to one embodiment of the present invention includes a housing 110 or 210, a guide part 120, and at least one transmissive part 130, 130a, or 130b.

The housing 110 or 210 may be formed to have a hollow form having a predetermined length such that a fluid introduced from the outside passes through the housing 110 or 210, and the guide part 120 may be disposed in the housing 110 or 210.

As an example, the housing 110 or 210 may include a body 111 having a hollow form in which both end portions are open, and an inlet port 112 and an outlet port 113 disposed at the both open end portions of the body 111, and the guide part 120 may be disposed in the body 111.

In addition, at least one transmissive part 130, 130a, or 130b which transmits an electron beam emitted from the outside to an inside of the body 111 may be provided at one side of the housing 110 or 210.

Accordingly, a fluid introduced through the inlet port 112 may move along the guide part 120 in the body 111 and may be discharged to the outside through the outlet port 113, and in a process in which the fluid passes through the inside of the body 111, an electron beam introduced through the transmissive part 130, 130a, or 130b may be emitted toward the fluid.

Here, the housing 110 or 210 may be formed such that a cross section thereof perpendicular to a longitudinal direction has a circular shape. Preferably, the cross section of a remaining portion of the housing 110 or 210 excluding the transmissive part 130, 130a, or 130b may have the circular shape.

As an example, the body 111 may be formed such that a cross section thereof perpendicular to the longitudinal direction has a circular shape, and the body 111 may have a constant diameter throughout an entire length thereof.

In this case, a cross section of a remaining part excluding the transmissive part 130, 130a, or 130b of the body 111 in which the transmissive part 130, 130a, or 130b is formed may have an arc shape. In addition, an inner diameter of an inlet side of the inlet port 112 may be relatively less than an inner diameter of the body 111. Accordingly, a fluid introduced from the outside through the inlet port 112 may be easily introduced into the body 111 due to a pressure gradient.

Accordingly, in the atmosphere purification reactor 100, 200, or 300 according to one embodiment of the present invention, a fluid introduced into the housing 110 or 210 through the inlet port 112 may easily rotate due to the guide part 120.

In the present invention, the inlet port 112 may include an inlet 112a having an inner diameter relatively less than the inner diameter of the body 111 and an extending opening 112b having an inner diameter which gradually increases from the inlet 112a and connects the inlet 112a to the body 111.

In addition, the outlet port 113 may be formed such that an inner diameter of an outlet 113a is relatively less than the inner diameter of the body 111 like the inlet port 112.

In addition, the outlet port 113 may include the outlet 113a having the inner diameter relatively less than the inner diameter of the body 111, and a reducing opening 113b having an inner diameter which gradually decreases from an end of the body 111 to the outlet 113a and connects the body 111 to the outlet 113a.

The guide part 120 may guide a moving path of a fluid introduced into the body 111 through the inlet port 112.

To this end, the guide part 120 may be disposed in the body 111 in the longitudinal direction.

Here, the guide part 120 may rotate the fluid which passes through the inside of the body 111.

Figure 3:
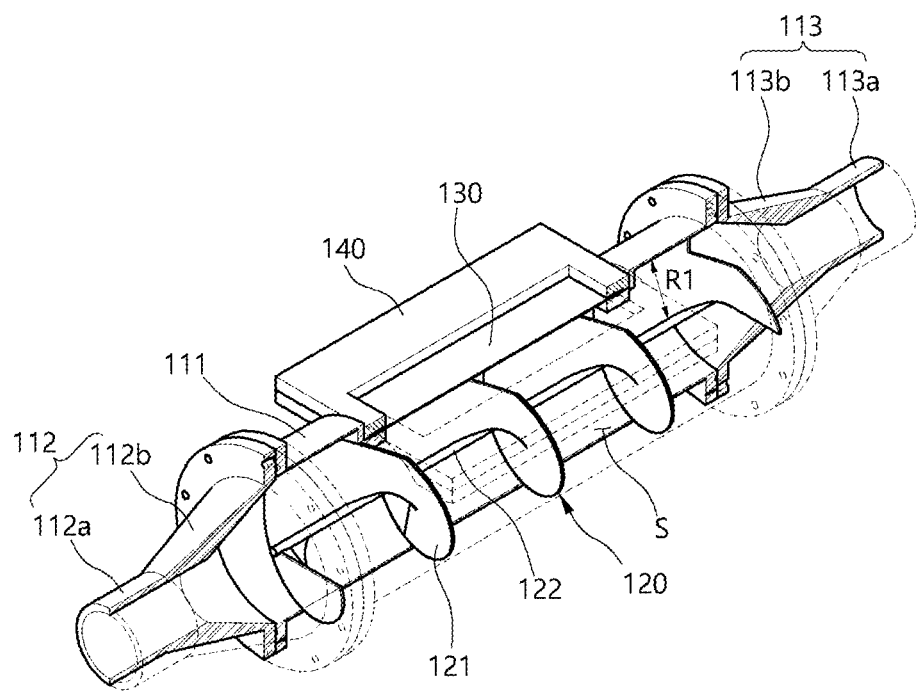
FIG. 3 is a view illustrating a state in which a part of a housing of FIG. 1 is cut.
Figure 4:
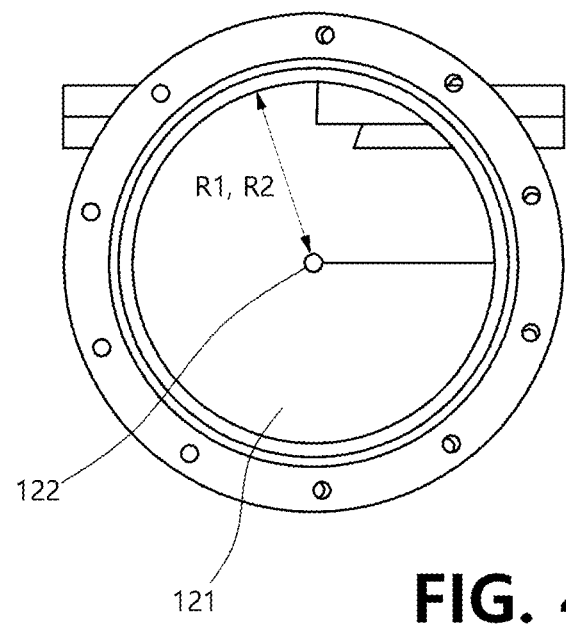
FIG. 4 is a front view illustrating the housing of FIG. 1.

To this end, as illustrated in FIGS. 3 to 5, the guide part 120 may include a central shaft 122 and a wing 121 wound around the central shaft 122, and the guide part 120 may be disposed in the body 111 in the longitudinal direction.

Here, the wing 121 may be spirally wound at least one time around the central shaft 122 disposed to be parallel to the longitudinal direction of the housing 210.

In addition, as illustrated in FIG. 4, the wing 121 may be formed to have a curved surface having a width R2 which is the same as an inner radius R1 of the body 111.

In addition, the wing 121 may be disposed such that one side end is in contact with an inner surface of the body 111, the central shaft 122 around which the wing 121 is wound may be disposed in parallel to the longitudinal direction of the housing 210, and the central shaft 122 may be disposed in the body 111 to match a central axis of the body 111.

Accordingly, an entirety of a fluid introduced into the body 111 through the inlet port 112 may move toward the outlet port 113 along a surface of the wing 121 and since an entirety of a fluid introduced into the body 111 through the inlet port 112 may rotate due to the wing 121 while moving toward the outlet port 113, all of the fluid may move to a position close to the transmissive part 130, 130a, or 130b.

In the present invention, the number of winding turns of the wing 121 may be four as illustrated in FIG. 3, eight as illustrated in (a) of FIG. 5, or sixteen as illustrated in (b) of FIG. 5. However, the number of winding turns of the wing 121 is not limited thereto and may be properly changed to correspond to a process capacity for a fluid.

In addition, although the wing 121 is illustrated to be wound at least one time around the central shaft 122 disposed in parallel to the longitudinal direction of the body 111 in the drawing, the present invention is not limited thereto, and the central shaft 122 may also be omitted. In this case, the guide part 120 may include only the wing 121 which is wound at least one time around a virtual central shaft disposed in parallel to the longitudinal direction of the body 111.

As described above, in the atmosphere purification reactor 100, 200, or 300 according to one embodiment of the present invention, a fluid introduced into the body 111 through the inlet port 112 may rotate due to the guide part 120 while moving toward the outlet port 113, the fluid introduced into the body 111 can move to the position close to the transmissive part 130, 130a, or 130b, and the fluid which has moved to the position close to the transmissive part 130, 130a, or 130b may be discharged to the outside through the outlet port 113 after being exposed to an electron beam introduced through the transmissive part 130, 130a, or 130b.

That is, in the atmosphere purification reactor 100, 200, or 300 according to one embodiment of the present invention, since all of the fluid introduced into the body 111 through the inlet port 112 moves to the position close to the transmissive part 130, 130a, or 130b, even when an intensity of the electron beam introduced through the transmissive part 130, 130a, or 130b is small, all of the fluid can be discharged to the outside through outlet port 113 after being exposed to the electron beam.

Accordingly, in the atmosphere purification reactor 100, 200, or 300 according to one embodiment of the present invention, all of the fluid introduced into the body 111 can be naturally prevented from being directly discharged without being exposed to the electron beam.

Accordingly, in the atmosphere purification reactor 100, 200, or 300 according to one embodiment of the present invention, even though an electron beam having lower energy which is lower than 0.5 MeV is irradiated through the transmissive part 130, 130a, or 130b, since the fluid can be uniformly exposed to the electron beam, an overall size can be minimized, and a sufficient process capacity can also be secured.

Accordingly, since the overall size of the atmosphere purification reactor 100 according to one embodiment of the present invention can be minimized, self-shielding can be possible, and an apparatus cost can be significantly reduced when compared to a conventional case in which a high energy electron beam method is used.

The above description may be seen with reference to FIGS. 6 to 9.

Figure 6:
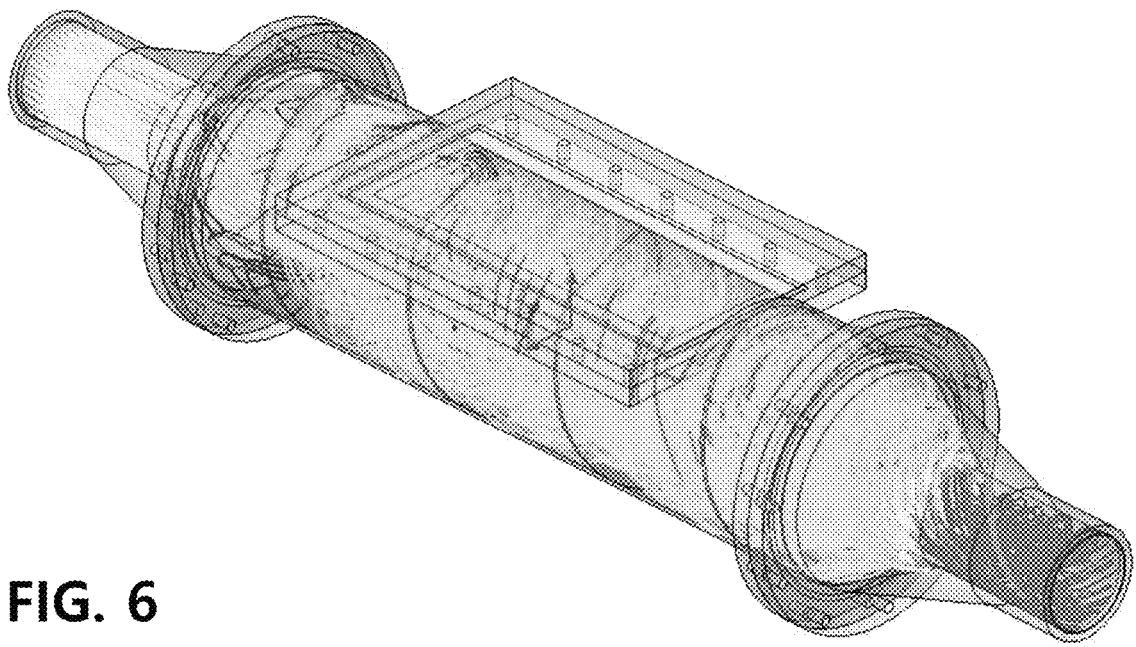
FIGS. 6 to 8 are schematically simulated images illustrating flows of flue gas according to forms of the guide part of the atmosphere purification reactor using an electron beam according to one embodiment of the present invention.
Figure 7:
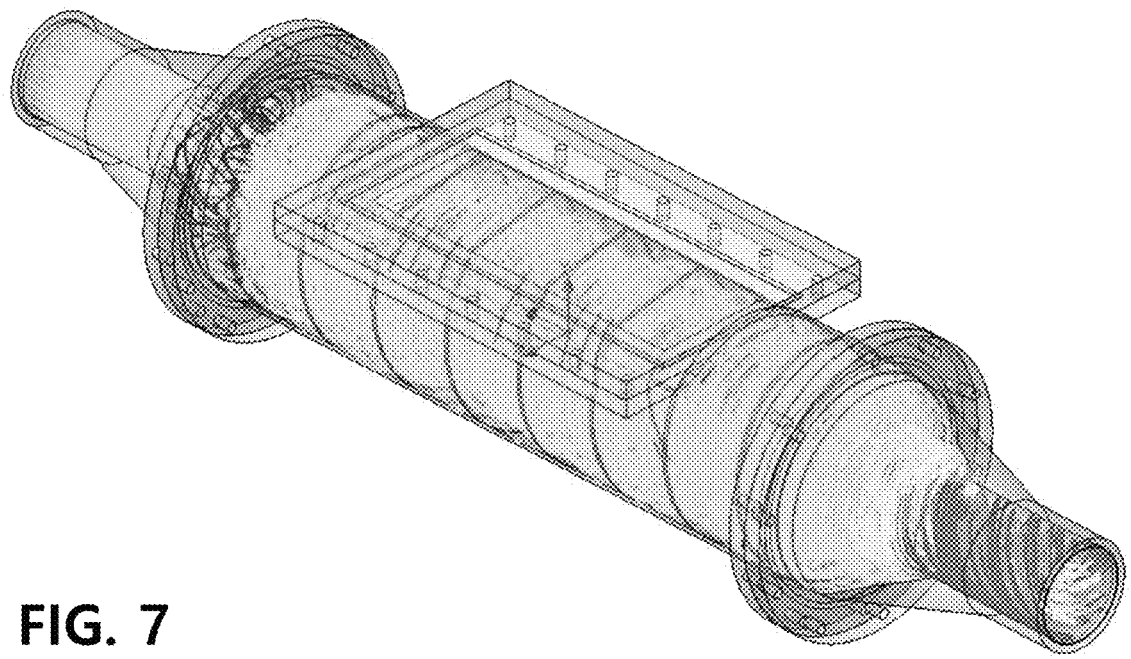
Figure 8:
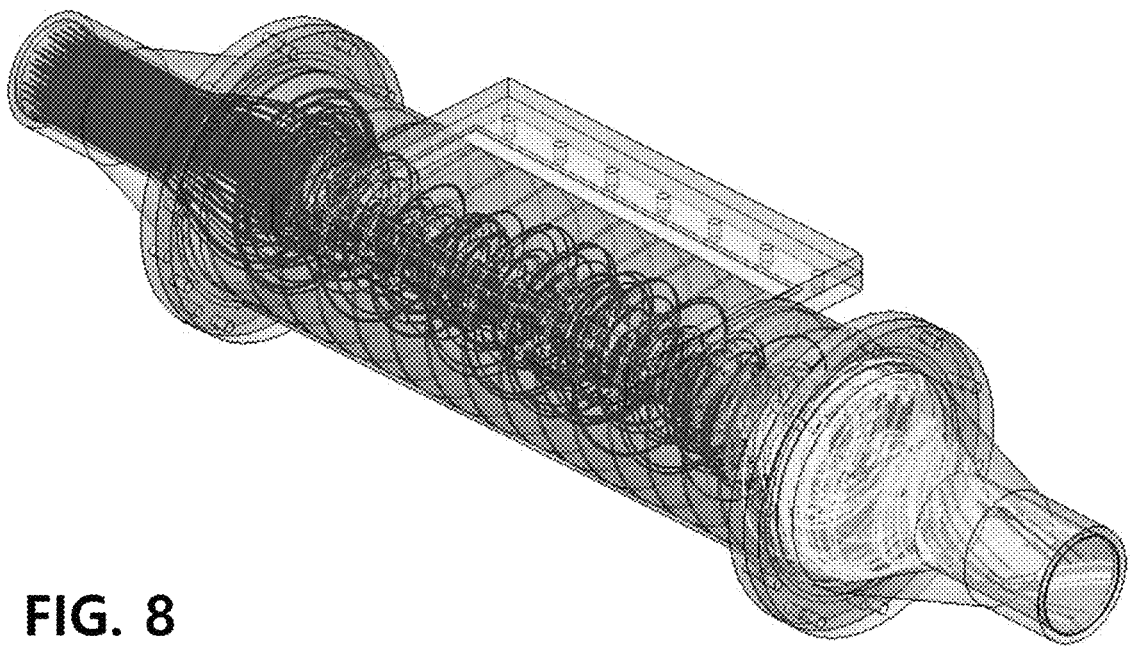
Figure 9:
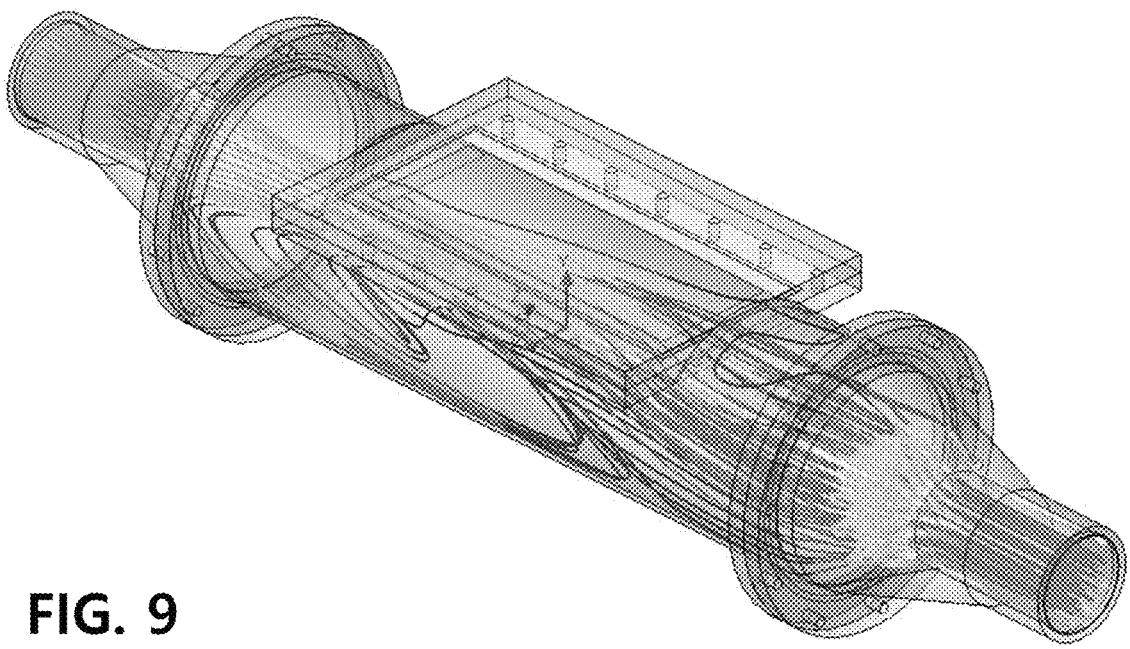
FIG. 9 is a schematically simulated view illustrating a flow of flue gas in a conventional atmosphere purification reactor using an electron beam in which a guide part is not used.

FIGS. 6 to 8 are schematically simulated images illustrating flows of flue gas according to forms of the guide part 120 of the atmosphere purification reactor 100 according to one embodiment of the present invention including the guide part 120, and FIG. 9 is a schematically simulated image illustrating a flow of a fluid in a conventional atmosphere purification reactor using an electron beam in which a guide part is not used.

Specifically, as illustrated in FIGS. 6 to 8, in the atmosphere purification reactor 100 according to one embodiment of the present invention, it may be seen that a fluid introduced into the body 111 through the inlet port 112 rotates due to the guide part 120 and moves toward the outlet port 113 via the position close to the transmissive part 130.

However, as illustrated in FIG. 9, in a conventional atmosphere purification reactor using an electron beam which does not include a guide part 120, it may be seen that a fluid introduced into an inside thereof is concentrated and passes through a central portion. Accordingly, in a case in which an intensity of an electron beam introduced into the reactor through a transmissive part 130 is small and a transmission depth of the electron beam is shallow, the fluid may be directly discharged to the outside without being easily exposed to the electron beam.

Accordingly, in the conventional atmosphere purification reactor using an electron beam which does not include the guide part 120, an electron beam having high energy which is higher than or equal to 2 MeV should be supplied to sufficiently emit an electron beam to a target fluid.

Accordingly, since a shielding structure of the conventional atmosphere purification reactor should be large or thick to sufficiently shield the electron beam which is higher than or equal to 2 MeV, there is a limit in that an overall size thereof should be large.

In addition, in a case in which a low energy electron beam is used to prevent the above-described limit, a size of the reactor may be decreased such that a fluid is sufficiently exposed to the electron beam even when a transmission depth of the electron beam is shallow, but in this case, there is a limit in that a sufficient process capacity may not be secured since the size of the reactor is decreased.

The at least one transmissive part 130, 130a, or 130b may transmit an electron beam emitted from the outside into the body 111. Accordingly, a fluid which passes through the inside of the body 111 may be exposed to the electron beam introduced through the at least one transmissive part 130, 130a, or 130b.

To this end, the at least one transmissive part 130, 130a, or 130b may be provided at one side of the housing 110 or 210.

Specifically, the body 111 may include at least one opening 114 which is opened to have a predetermined size, and the at least one transmissive part 130, 130a, or 130b may be disposed to cover the at least one opening 114.

Here, the at least one opening 114 may be formed to have the number thereof corresponding to the at least one transmissive part 130, 130a, or 130b. In addition, the at least one transmissive part 130, 130a, or 130b may be a film member having a plate shape and a predetermined area but is not limited thereto, and any material capable of easily transmitting an electron beam may be used therefor.

Here, the at least one transmissive part 130, 130a, or 130b may be detachably coupled to the body 111. To this end, the body 111 may include at least one flange portion 115 formed along an edge of the opening 114, and a coupling frame 140,140a, or 140b in which a through hole 142 is formed may be coupled to the flange portion 115.

In this case, an edge of the transmissive part 130, 130a, or 130b may be disposed between the flange portion 115 and the coupling frame 140,140a, or 140b. Accordingly, when the coupling frame 140,140a, or 140b is coupled to the flange portion 115, the edge of the transmissive part 130, 130a, or 130b may be fixed by the coupling frame 140,140a, or 140b and the flange portion 115, and the transmissive part 130, 130a, or 130b may be exposed to the outside through the through hole 142.

In addition, a sealing member 150, such as an O-ring, may be disposed on a contact surface of the flange portion 115 and the transmissive part 130, 130a, or 130b which face each other. The sealing member 150 may prevent a fluid which moves in the body 111 from being discharged to the outside through the opening 114.

Here, the atmosphere purification reactor 200 according to one embodiment of the present invention may be formed such that a fluid introduced from the outside is exposed to electron beams at a plurality of positions.

That is, the atmosphere purification reactor 200 according to one embodiment of the present invention may include a plurality of transmissive parts 130a and 130b.

Accordingly, since the atmosphere purification reactor 200 according to the present embodiment processes the fluid introduced into the body 111 using electron beams emitted through the plurality of transmissive parts 130a and 130b, a process capacity thereof can be increased without reducing process efficiency.

Specifically, as illustrated in FIGS. 11 to 14, in the atmosphere purification reactor 200 according to one embodiment of the present invention, the plurality of transmissive parts 130a and 130b may include a first transmissive part 130a and a second transmissive part 130b which are formed at different positions in the housing 210.

Accordingly, a fluid introduced into the housing 210 may be exposed to electron beams introduced through the first transmissive part 130a and the second transmissive part 130b while passing through the inside of the body 111.

Here, in the atmosphere purification reactor 200 according to the present embodiment, the first transmissive part 130a and the second transmissive part 130b may be disposed to be collinear with each other, the body 111 may have the inner diameter which has a size in which an overlap region S in which the electron beam passing through the first transmissive part 130a overlaps the electron beam passing through the second transmissive part 130b may be formed.

That is, the overlap region S in which the electron beam passing through the first transmissive part 130a overlaps the electron beam passing through the second transmissive part 130b may be formed in a central portion in the body 111 and may be formed to extend from the central portion in the body 111 to a position spaced a predetermined distance from the inner surface of the body 111.

Figure 14:
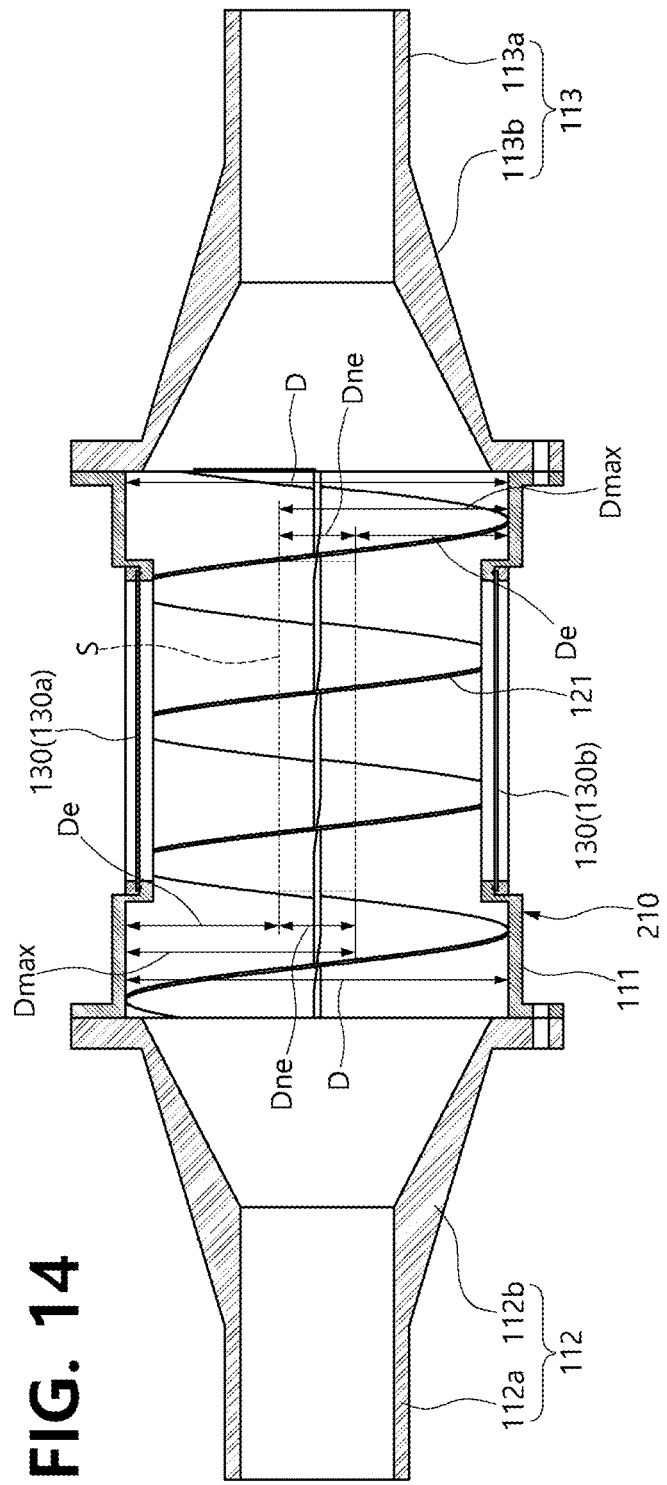
FIG. 14 is a view for describing a maximum transmission depth, an effective transmission depth, and an overlapping transmission depth of an electron beam of the atmosphere purification reactor using an electron beam according to another embodiment of the present invention.

As an example, as illustrated in FIG. 14, the first transmissive part 130a may be disposed in an upper side of the body 111, the second transmissive part 130b may be disposed in a lower side of the body 111, and an intensity of the electron beam passing through the first transmissive part 130a may be the same as an intensity of the electron beam passing through the second transmissive part 130b.

In this case, the overlap region S may be positioned at a position ranging from 2/5 to 3/5 into the inner diameter D of the body 111. In addition, a length L of the overlap region S formed at the position ranging from 2/5 to 3/5 into the inner diameter D of the body 111 may have a size corresponding to a remaining length after subtracting an effective transmission depth De of the electron beam from a maximum transmission depth Dmax of the electron beam emitted through the first transmissive part 130a or the second transmissive part 130b. In addition, the inner diameter D of the body 111 may have a size corresponding to a length obtained by adding the maximum transmission depth Dmax of the electron beam emitted through the first transmissive part 130a or the second transmissive part 130b to the effective transmission depth De of the electron beam.

As a non-restrictive example, the length L of the overlap region S of the electron beams formed in the body 111 may be a length corresponding to 1/3 of the maximum transmission depth of the electron beam, and the inner diameter D of the body 111 may have a size of 5/3 of the maximum transmission depth of the electron beam.

Accordingly, in the atmosphere purification reactor 200 according to the present embodiment, the overlap region S may be formed in which two electron beam overlap, that is, a portion, which exceeds the effective transmission depth De, of an electron beam introduced into the body 111 through the first transmissive part 130a overlaps a portion, which exceeds the effective transmission depth De, of an electron beam introduced into the body 111 through the second transmissive part 130b.

Generally, a maximum transmission depth Dmax of an electron beam is determined according to a magnitude of beam energy, and a maximum transmission depth in air according to a magnitude of beam energy provided by the national institute of standards and technology (NIST) follows in Table 1.

TABLE 1

Maximum Transmission Depth in Air According to Beam Energy

| Beam Energy [Mev] | Maximum Transmission Depth Dmax [cm] |
|---|---|
| 0.01 | 0.23 |
| 0.05 | 3.20 |
| 0.1 | 12.73 |
| 0.2 | 39.86 |
| 0.3 | 74.73 |
| 0.4 | 114.20 |
| 0.5 | 156.47 |
| 0.6 | 200.63 |
| 0.7 | 245.96 |
| 0.8 | 292.00 |
| 0.9 | 338.51 |
| 1 | 385.25 |
| 3 | 1300.39 |
| 5 | 2149.02 |
| 10 | 4072.16 |

Such an electron beam loses energy as a depth is increased, and generally, an effective transmission depth De, which is a position at which a magnitude of energy is the same as a magnitude of the energy at the surface, is a position corresponding to ⅔ of the maximum transmission depth Dmax. That is, a depth corresponding to ⅓ of the maximum transmission depth Dmax of the electron beam is an ineffective transmission depth Dne at which energy loss occurs.

In the present invention, the first transmissive part 130a and the second transmissive part 130b may be formed to be collinear with each other in the housing 210, and the body 111 may be formed to have the inner diameter which is 5/3 of the maximum transmission depth Dmax of the electron beam such that the overlap region S is formed in which a first electron beam passing through the first transmissive part 130a overlaps a second electron beam passing through the second transmissive part 130b at a region corresponding to the ineffective transmission depth Dne exceeding ⅔ of the maximum transmission depth Dmax, which is the effective transmission depth De.

Accordingly, in the present invention, since the first electron beam or the second electron beam overlaps the second electron beam or the first electron beam at the ineffective transmission depth Dne exceeding the effective transmission depth to compensate for lost energy, energy may be obtained to have a level, which is the same as that of energy at the effective transmission depth De, even at the ineffective transmission depth Dne beyond the effective transmission depth De.

That is, as illustrated in FIG. 14, the first electron beam at the ineffective transmission depth Dne after subtracting the effective transmission depth De from the maximum transmission depth Dmax of the first electron beam passing through the first transmissive part 130a may overlap the second electron beam at the ineffective transmission depth Dne after subtracting the effective transmission depth De from the maximum transmission depth Dmax of the second electron beam passing through the second transmissive part 130b.

Accordingly, since energy of an electron beam, which is lost at the ineffective transmission depth Dne, is supplemented by energy of another electron beam at the ineffective transmission depth Dne, the energy of the electron beam at the ineffective transmission depth Dne may have a level which is the same as a level of the energy at the effective transmission depth De.

In other words, in the atmosphere purification reactor 200 according to the present embodiment, in a case in which the inner diameter D of the body 111 is set to be 5/3 of the maximum transmission depth Dmax of an electron beam, electron beams may be introduced into the body 111 such that energy therein has a constant level regardless of depths from the transmissive parts 130a and 130b.

Accordingly, in the present invention, when compared to a method in which an electron beam is emitted through one transmissive part, even when an electron beam having the same energy is used, the inner diameter of the body 111 may be increased to not only 2 times the effective transmission depth De of the electron beam but as much as 2.5 times the effective transmission depth De of the electron beam without reducing process efficiency.

Accordingly, in the atmosphere purification reactor 200 according to the present embodiment, since lost energy is compensated for due to the overlap region S, reduction of process efficiency can be prevented, and thus an amount of a fluid passing through the inside of the body 111 can be increased to increase a process capacity without reducing the process efficiency.

Meanwhile, the atmosphere purification reactor 300 according to one embodiment of the present invention may be formed such that a fluid introduced from the outside may sequentially pass through a plurality of reactors 100a and 100b.

As an example, the atmosphere purification reactor 300 according to the present embodiment may include the plurality of reactors 100a and 100b, and the plurality of reactors 100a and 100b may be connected in series.

Accordingly, in the atmosphere purification reactor 300 according to the present embodiment, since a purification reaction occurs a plurality of times while a fluid introduced from the outside sequentially passes through the plurality of reactors 100a and 100b, process efficiency can be significantly improved.

In addition, in the atmosphere purification reactor 300 according to the present embodiment, since the fluid is purified the plurality of times while sequentially passing through the plurality of reactors 100a and 100b, a size of the reactor may be decreased, and even when a low energy electron beam is supplied to the reactor, a highly contaminated fluid can be easily processed.

Here, in the atmosphere purification reactor 300 according to the present embodiment, portions of the plurality of reactors 100a and 100b connected in series to each other may be connected through a Venturi tube.

Accordingly, in the atmosphere purification reactor 300 according to the present embodiment, even when the plurality of reactors are connected in series and a total path through which a fluid passes through the entire reactor is increased, since pressures applied to the reactors 100a and 100b may be reduced, the atmosphere purification reactor 300 can be miniaturized, and durability thereof can also be improved.

Figure 17:
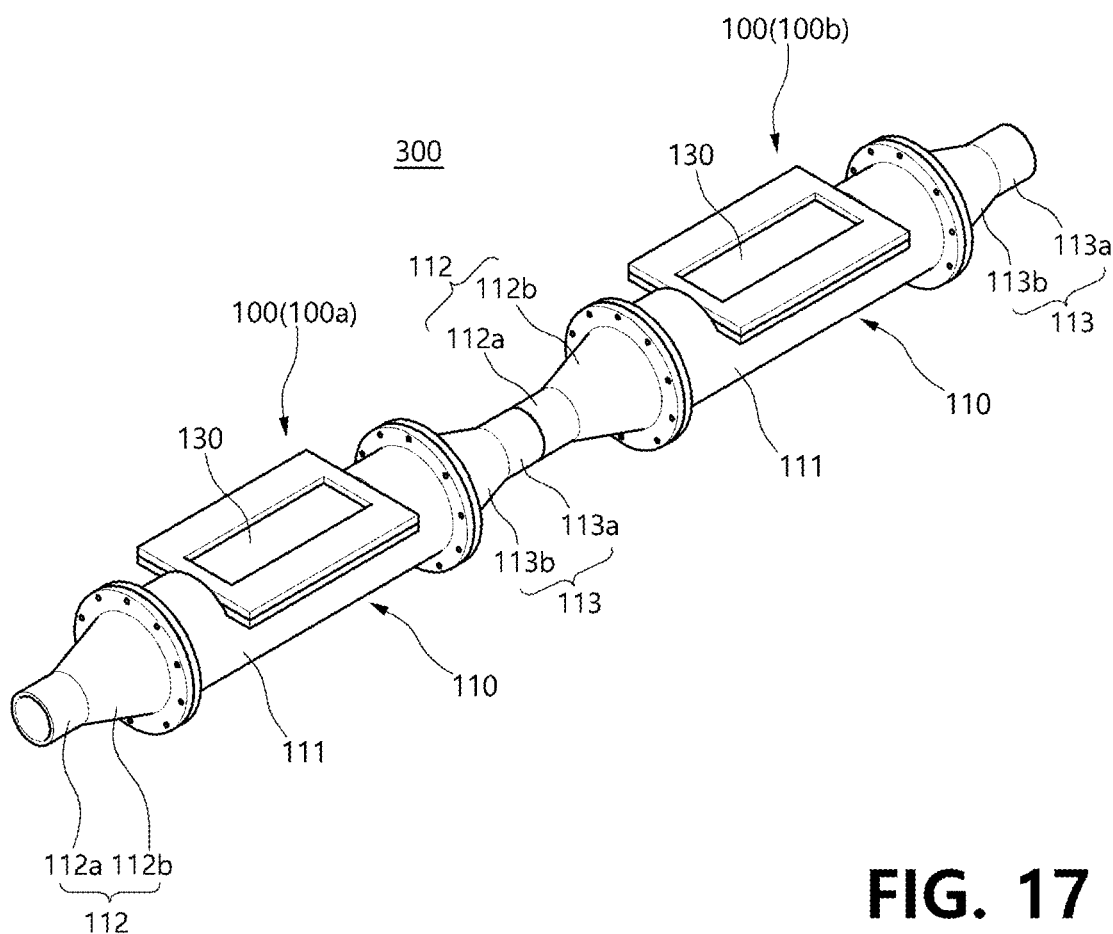
FIG. 17 is a schematic view illustrating an atmosphere purification reactor using an electron beam according to still another embodiment of the present invention.
Figure 18:
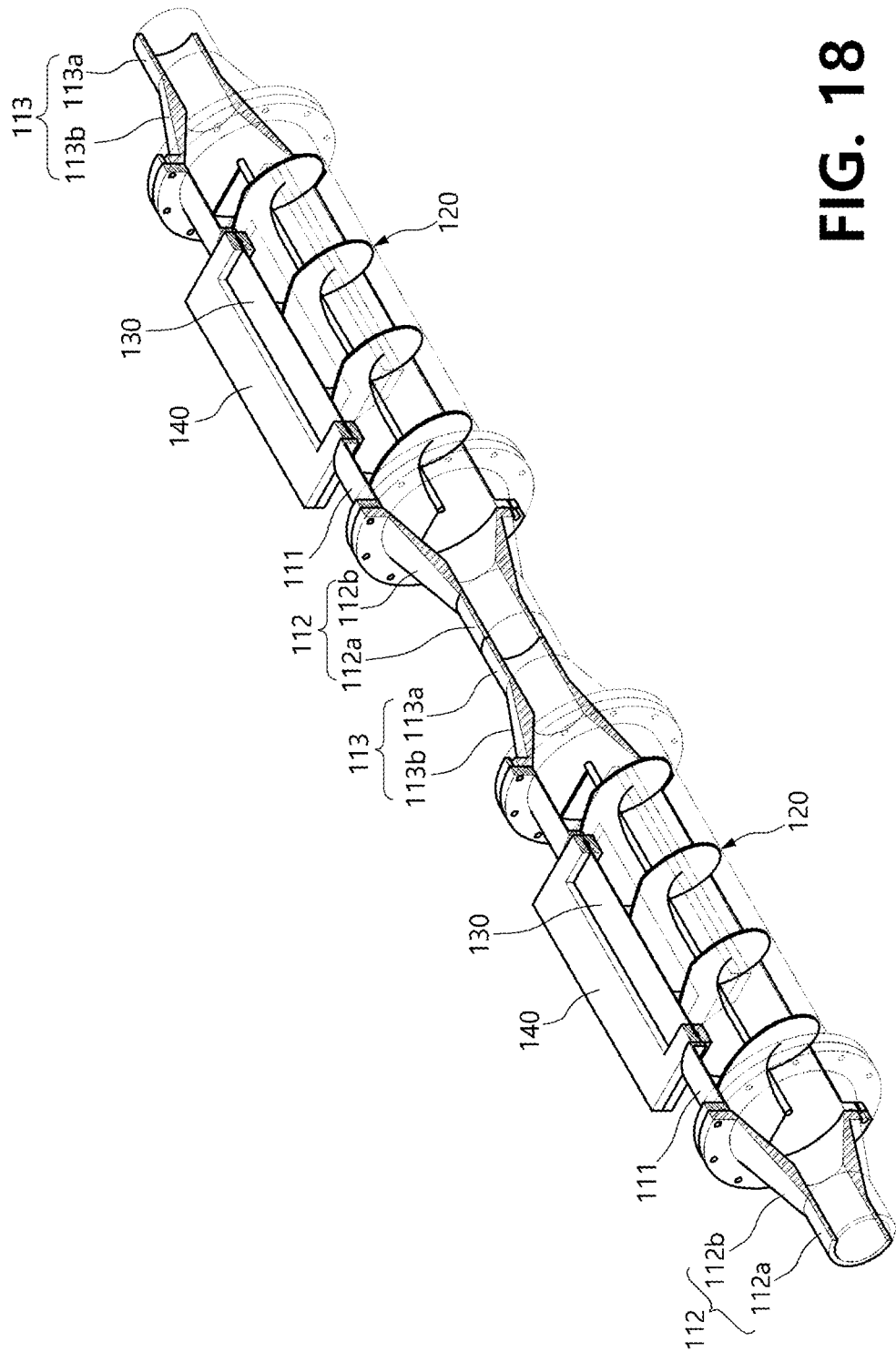
FIG. 18 is a view illustrating a state in which a part of a housing of FIG. 17 is cut.

As a specific example, as illustrated in FIGS. 17 and 18, the atmosphere purification reactor 300 according to the present embodiment may include a first reactor 100a and a second reactor 100b which are connected in series, the first reactor 100a may be disposed in front of the second reactor 100b, and an outlet port 113 of the first reactor 100a may be connected in series to an inlet port 112 of the second reactor 100b so that the Venturi tube can be formed.

That is, in the case in which the first reactor 100a and the second reactor 100b are connected in series, the outlet port 113 of the first reactor 100a may be connected to the inlet port 112 of the second reactor 100b.

Accordingly, in the outlet port 113 of the first reactor 100a and the inlet port 112 of the second reactor 100b, since a reducing opening 113b, an outlet 113a, an inlet 112a, and an extending opening 112b are sequentially connected, the Venturi tube may be formed.

Accordingly, a fluid introduced from the outside through the inlet port 112 may be easily introduced into a body 111 due to a pressure gradient, and even when the fluid introduced into the body 111 through the inlet port 112 rotates due to a guide part 120, the fluid may be discharged to an inlet port of the second reactor 100b disposed at a rear end thereof, or the outside via the reducing opening 113b and the outlet 113a.

Accordingly, even when the fluid introduced into the body 111 rotates in the body 111 due to the guide part 120, since occurrence of turbulence is minimized while the fluid passes through the outlet port 113, a decrease in a passing speed of the fluid is prevented, and thus a decrease in a process speed for the fluid can be prevented.

In addition, since a Venturi effect occurs while the fluid moving from the first reactor 100a to the second reactor 100b passes through the Venturi tube, the fluid may be introduced into the second reactor 100b after a pressure thereof is decreased.

Accordingly, damage due to a high pressure to the guide part 120, which is disposed in the body 111 of the second reactor 100b and guides a moving path of the fluid, is prevented, and thus durability thereof can be improved.

Accordingly, in the atmosphere purification reactor 300 according to the present embodiment, after a first reaction in which a fluid introduced into the first reactor 100a from the outside absorbs energy of an electron beam occurs in the first reactor 100a, the fluid may move toward the second reactor 100b, and a second reaction may occur in which the fluid, which has passed through the first reactor 100a and moved to the second reactor 100b, absorbs energy of an electron beam in the second reactor 100a.

Accordingly, in the atmosphere purification reactor 300 according to the present embodiment, since purification occurs a plurality of times while the fluid sequentially passes through the first reactor 100a and the second reactor 100b, sizes of the reactors can be decreased, and even when low energy electron beams are supplied to the reactors, a highly contaminated fluid can be easily processed.

In addition, in the atmosphere purification reactor 300 according to the present embodiment, the fluid in which the first reaction occurs in the first reactor 100a may move to the second reactor 100b through the Venturi tube formed by the outlet port 113 of the first reactor 100a and the inlet port 112 of the second reactor 100b being connected.

Accordingly, since the Venturi effect is occurred in the fluid which moves from the first reactor 100a toward the second reactor 100b while the fluid passes through the Venturi tube, the fluid may be introduced into the second reactor 100b after a pressure of the fluid is decreased.

Accordingly, in the atmosphere purification reactor 300 according to the present embodiment, even when an overall path of the fluid which passes through the entire reactor is increased because the plurality of reactors are connected in series, since pressures applied to each of the reactors 100a and 100b may be decreased, miniaturization of the reactor can be achieved, and durability thereof can also be improved.

A Venturi effect is an effect in which a pressure of a fluid relatively decreases while the fluid passes through a narrow portion in which a diameter is small in a pipe. Since such a Venturi effect is known, a detailed description thereof will be omitted.

Meanwhile, the atmosphere purification reactor 100 illustrated in FIGS. 1 to 4 is used as each of the first reactor 100a and the second reactor 100b included in the atmosphere purification reactor 300 according to the present embodiment, but the present invention is not limited thereto, and the atmosphere purification reactor 200 illustrated in FIGS. 11 to 15 may also be used as each of the first reactor 100a and the second reactor 100b included in the atmosphere purification reactor 300 according to the present embodiment.

In addition, the atmosphere purification reactor 100 illustrated in FIGS. 1 to 4 and the atmosphere purification reactor 200 illustrated in FIGS. 11 to 15 may be used as the first reactor 100a and the second reactor 100b included in the atmosphere purification reactor 300 according to the present embodiment.

In addition, a known reactor using an electron beam may also be used as each of the first reactor 100a and the second reactor 100b included in the atmosphere purification reactor 300 according to the present embodiment.

In addition, the number of the reactors 100a and 100b included in the atmosphere purification reactor 300 according to the present embodiment may also be three or more.

Meanwhile, the above-described atmosphere purification reactor 100, 200, or 300 may be applied to an atmosphere purification apparatus 1000, 2000, or 3000.

Figure 10:
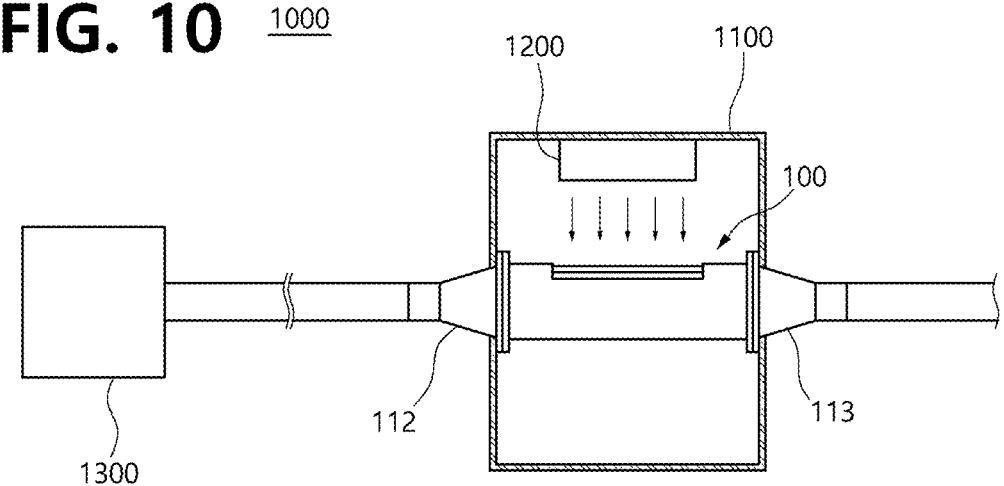
FIG. 10 is a schematic view illustrating the atmosphere purification apparatus according to one embodiment of the present invention.
Figure 11:
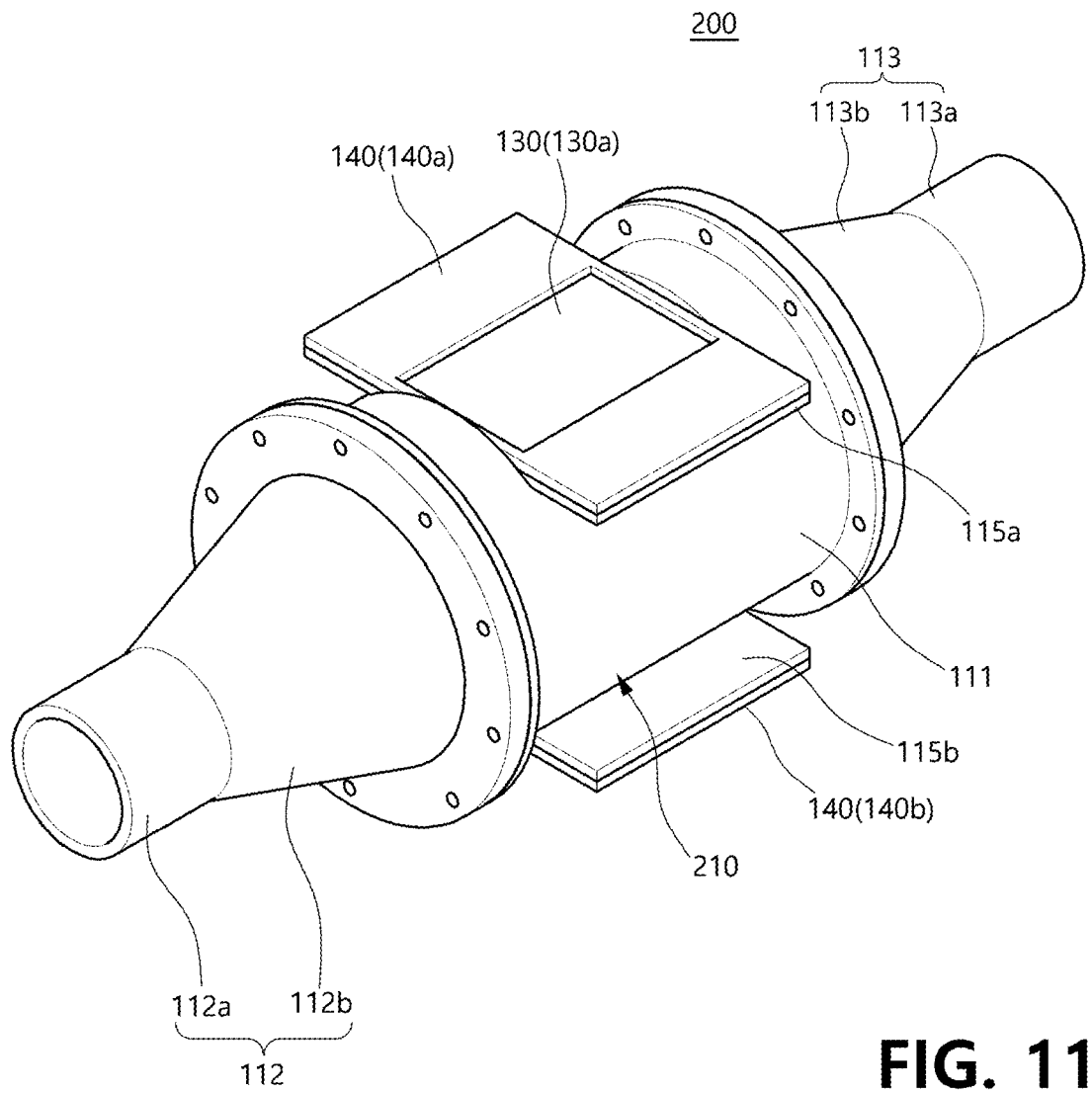
FIG. 11 is a schematic view illustrating an atmosphere purification reactor using an electron beam according to another embodiment of the present invention.
Figure 12:
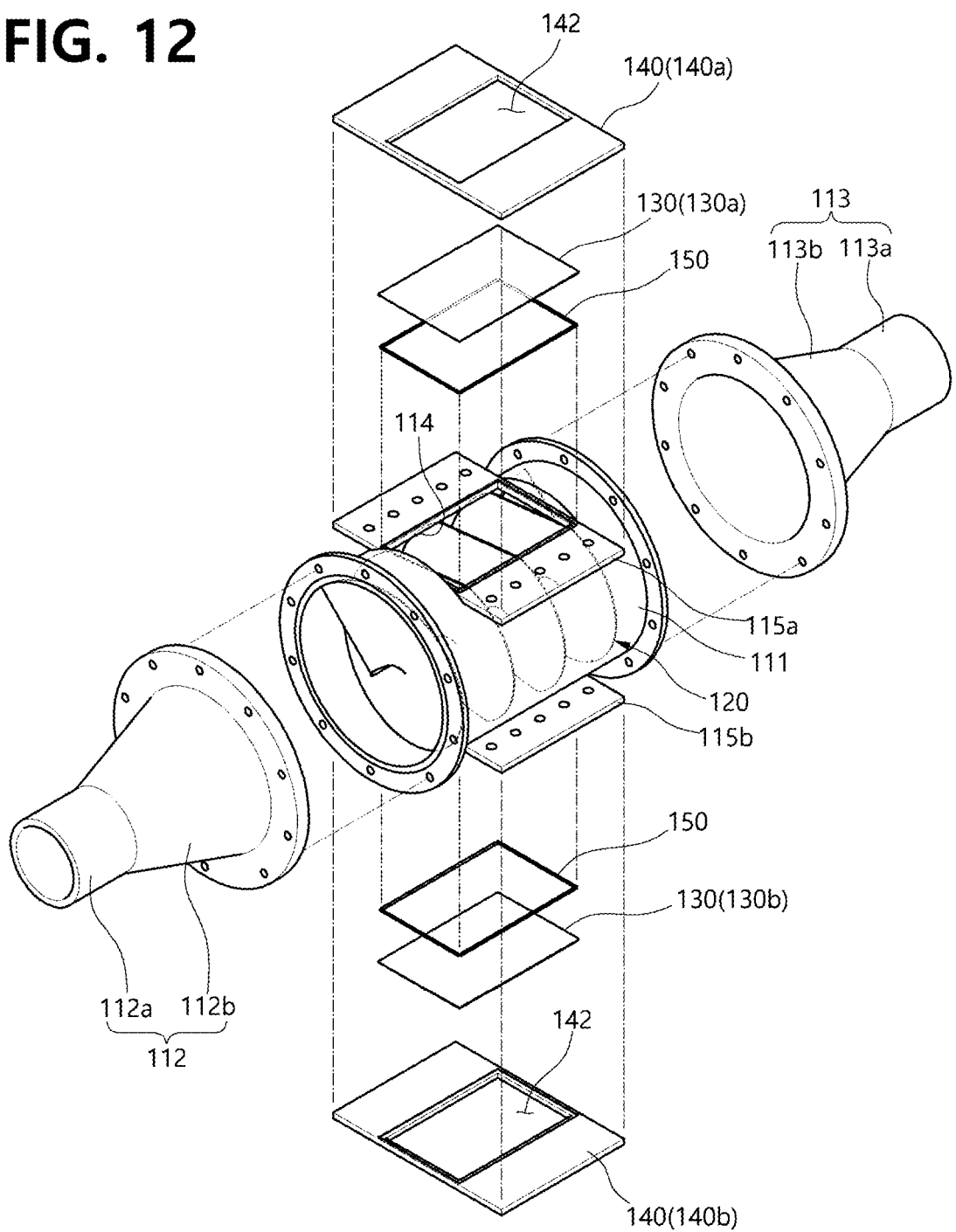
FIG. 12 is an exploded view of FIG. 11.
Figure 13:
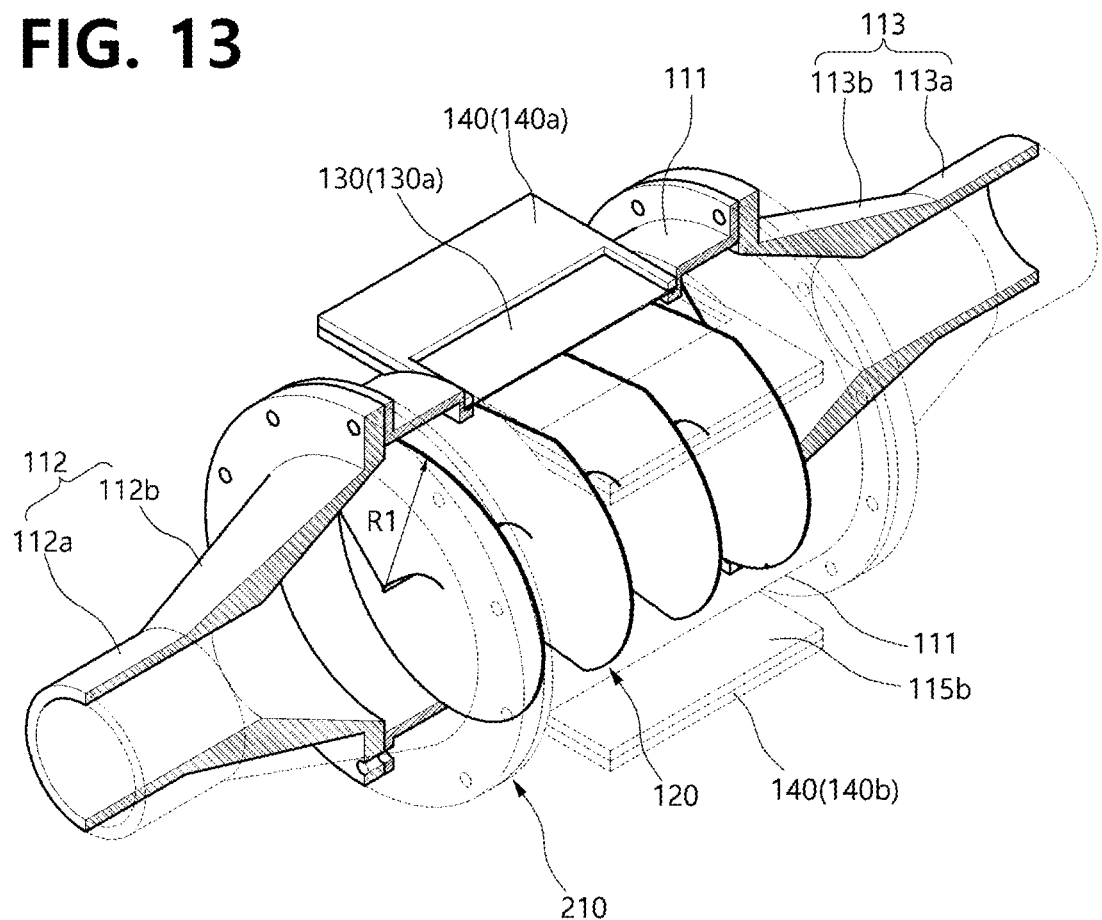
FIG. 13 is a view illustrating a state in which a part of a housing of FIG. 11 is cut.
Figure 19:
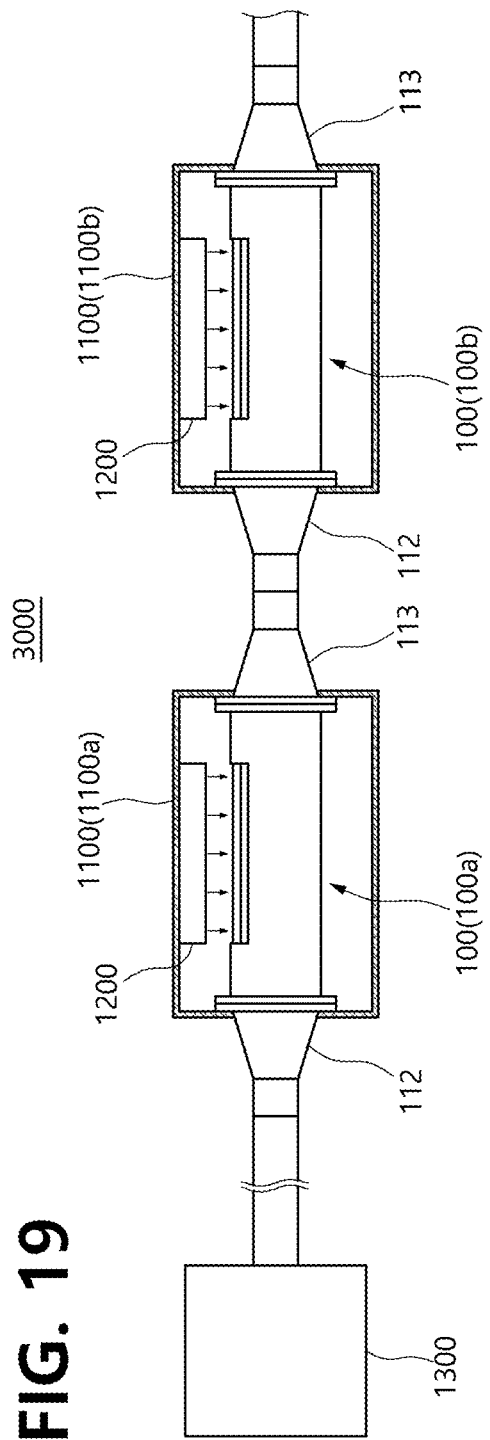
FIG. 19 is a schematic view illustrating an atmosphere purification apparatus according to still another embodiment of the present invention.

As an example, the atmosphere purification apparatus 1000, 2000, or 3000 according to one embodiment of the present invention may include at least one chamber 1100, 1100a, or 1100b, the atmosphere purification reactor 100, 200, or 300, and an electron beam generator 1200 as illustrated in FIG. 10, 16, or 19.

Here, the above-described atmosphere purification reactor 100, 200, or 300 may be directly applied to the atmosphere purification reactor 100, 200, or 300.

That is, the atmosphere purification reactor 100 may include a housing 110, a guide part 120, and a transmissive part 130, and the atmosphere purification reactor 200 may include a housing 210, a guide part 120, and two transmissive parts 130a and 130b.

In addition, the atmosphere purification reactor 300 may include a first reactor 100a and a second reactor 100b as described above, the first reactor 100a and the second reactor 100b may be connected in series, and an outlet port 113 of the first reactor 100a and an inlet port 112 of the second reactor 100b may be connected to form a Venturi tube.

Since a description of the atmosphere purification reactor 100, 200, or 300 is the same as the above description, the description will be omitted.

The at least one chamber 1100, 1100a, or 1100b may be formed to have a box form having an inner space. The chamber 1100, 1100a, or 1100b may provide an installation space in which the atmosphere purification reactor 100, 200, or 300 and the electron beam generator 1200 are installed and may serve to shield an electron beam emitted from the electron beam generator 1200.

As an example, the chamber 1100, 1100a, or 1100b may be formed of a metal material such as aluminum.

In this case, the inlet port 112 and the outlet port 113 of the atmosphere purification reactor 100, 200, or 300 may be fixed to the chamber 1100, 1100a, or 1100b, and the electron beam generator 1200 may be disposed to be positioned above the transmissive part 130, 130a, or 130b.

In addition, as illustrated in FIG. 16, in a case in which the plurality of transmissive parts 130a and 130b are provided in the atmosphere purification reactor 200, the number of electron beam generators 1200 may be provided to correspond to the plurality of transmissive parts 130a and 130b, and the plurality of electron beam generators 1200 may be positioned at positions corresponding to the plurality of transmissive parts 130a and 130b.

Accordingly, an electron beam generated by the electron beam generator 1200 may easily pass through an inside of the housing 110 or 210 through the transmissive part 130, 130a, or 130b. Here, the electron beam generator 1200 may be a low energy electron accelerator which generates an electron beam having low energy of 0.5 MeV or less. In this case, the chamber 1100, 1100a, or 1100b may serve as a shield chamber which shields against radiation of the electron beam generated by the electron beam generator 1200.

Accordingly, in the atmosphere purification apparatus 1000, 2000, or 3000 according to one embodiment of the present invention, even when the chamber 1100, 1100a, or 1100b is formed to have a minimum size for installing the atmosphere purification reactor 100, 200, or 300 and at least one electron beam generator 1200, the radiation of the electron beam generated by the at least one electron beam generator 1200 can be sufficiently shielded.

Accordingly, the atmosphere purification apparatus 1000, 2000, or 3000 according to one embodiment of the present invention can be formed as a module type apparatus because the size of the chamber 1100, 1100a, or 1100b can be minimized.

Here, the inlet port 112 may be directly connected to an exhaust gas source 1300. As an example, the exhaust gas source 1300 may be an exhaust gas duct of a production facility. Accordingly, in the atmosphere purification apparatus 1000, 2000, or 3000 according to one embodiment of the present invention, in a case in which purification of a fluid discharged from the exhaust gas duct is required, since the inlet port 112 is directly connected to the exhaust gas duct, convenience in use can be improved.

Meanwhile, in the above description, it has been illustrated that the electron beam generator 1200 is the electron accelerator having the low energy of 0.5 MeV or less, but the electron beam generator 1200 is not limited thereto, and the electron beam generator 1200 may also be an electron accelerator having median or high energy greater than 0.5 MeV, and the above-described atmosphere purification reactor 100, 200, or 300 may also be applied to the atmosphere purification apparatus using the electron accelerator having median or high energy greater than 0.5 MeV.

While one embodiment of the present invention has been described above, the spirit of the present invention is not limited to the embodiment proposed in this specification, it will be understood by those skilled in the art that other embodiments may be easily suggested by adding, changing, and deleting components, and the other embodiments will fall within the spiritual range of the present invention.

The invention claimed is:

1. An atmosphere purification reactor using an electron beam comprising:
   a housing which has a predetermined length and is formed to have a hollow form such that a fluid introduced from an outside passes through the housing;
   a guide part which is disposed in the housing in a longitudinal direction and guides a moving path of the fluid such that the fluid introduced into the housing moves while rotating; and
   a transmissive part which is provided at one side of the housing so as to transmit an electron beam into the housing,
   wherein the guide part includes a wing which is spirally wound at least one time in the longitudinal direction of the housing,
   wherein one side end of the wing is in contact with an inner surface of the housing so that an entirety of a fluid introduced into the housing moves toward the transmissive part and is irradiated by an electron beam introduced through the transmissive part, in a process in which the fluid passes through an inside of the housing,
   wherein a portion of the wing located adjacent to the transmissive part is formed in a linear shape.

2. The atmosphere purification reactor of claim 1, wherein the housing is formed such that a cross section thereof perpendicular to the longitudinal direction partially or entirely has an arc shape.

3. The atmosphere purification reactor of claim 1, wherein the wing is formed to have a curved surface having a width which is the same as an inner radius of the housing.

4. The atmosphere purification reactor of claim 1, wherein a central shaft around which the wing is wound matches a central axis of the housing.

5. The atmosphere purification reactor of claim 1, wherein:
   the housing includes an opening which is opened to have a predetermined size at a side portion of the housing; and
   the transmissive part is a film member which covers the opening.

6. The atmosphere purification reactor of claim 5, wherein:
   the housing includes a flange portion formed along an edge of the opening; and
   the transmissive part is detachably coupled to the flange portion by a coupling frame coupled to the flange portion.

7. The atmosphere purification reactor of claim 1, wherein the housing includes:
   a body having both end portions which are open and formed as a hollow form;
   an inlet port provided at a front end of the body such that the fluid is introduced into the body; and
   an outlet port provided at a rear end of the body such that the fluid is discharged from an inside of the body to the outside.

8. The atmosphere purification reactor of claim 7, wherein the inlet port is formed such that an inner diameter at an inlet side of the inlet port is relatively less than an inner diameter of the body.

9. The atmosphere purification reactor of claim 1, wherein:
   the transmissive part includes two transmissive parts provided at the housing; and
   the two transmissive parts include a first transmissive part and a second transmissive part which are disposed to be collinear with each other such that an overlap region in which electron beams emitted into the housing overlap is formed.

10. The atmosphere purification reactor of claim 9, wherein the overlap region is formed at a position ranging from $2/5$ to $3/5$ into an inner diameter (D) of the housing.

11. The atmosphere purification reactor of claim 10, wherein a length (L) of the overlap region has a size corresponding to a remaining length after subtracting an effective transmission depth (De) of the electron beam from a maximum transmission depth (Dmax) of the electron beam.

12. The atmosphere purification reactor of claim 10, wherein the inner diameter (D) of the housing has a size corresponding to a length obtained by adding a maximum transmission depth (Dmax) of the electron beam emitted through the first transmissive part or the second transmissive part to an effective transmission depth (De) of the electron beam.

13. The atmosphere purification reactor of claim 1, comprising a plurality of atmosphere purification reactors which are connected in series,
   wherein an outlet port of the atmosphere purification reactor disposed at a front end of the plurality of atmosphere purification reactors is connected to an inlet port of the atmosphere purification reactor disposed at a rear end thereof in series to form a Venturi tube.

14. An atmosphere purification apparatus comprising:
   a chamber having an inner space;

the atmosphere purification reactor using an electron beam of claim 1 which is disposed in the inner space such that the housing intersects the chamber; and at least one electron beam generator which is disposed in the inner space to be positioned above the transmissive part and emits an electron beam into the housing.

15. The atmosphere purification apparatus of claim 14, wherein the chamber is formed of a metal material so as to shield against radiation.

16. The atmosphere purification apparatus of claim 14, wherein the atmosphere purification reactor using an electron beam is directly connected to an exhaust gas source.

17. The atmosphere purification apparatus of claim 14, wherein the electron beam generator is an electron accelerator having low energy of 0.5 MeV or less.

* * * * *